(12) United States Patent
Uchiyama (10) Patent No.: US 12,132,405 B2
(45) Date of Patent: Oct. 29, 2024

(54) POWER SOURCE APPARATUS AND IMAGE FORMING APPARATUS

(71) Applicant: CANON KABUSHIKI KAISHA, Tokyo (JP)

(72) Inventor: Nobuyuki Uchiyama, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 210 days.

(21) Appl. No.: 17/726,722

(22) Filed: Apr. 22, 2022

(65) Prior Publication Data

US 2022/0352825 A1    Nov. 3, 2022

(30) Foreign Application Priority Data

Apr. 30, 2021    (JP) .................................. 2021-077665

(51) Int. Cl.
*H02M 3/335*    (2006.01)
*G03G 15/00*    (2006.01)
(Continued)

(52) U.S. Cl.
CPC .... *H02M 3/33569* (2013.01); *G03G 15/5004* (2013.01); *H02M 1/08* (2013.01);
(Continued)

(58) Field of Classification Search
CPC .... H02M 3/33569; H02M 1/08; H02M 1/346; H02M 3/33507; H02M 1/4258; H02M 7/043; H02M 7/05; H02M 1/0029; H02M 1/0054; H02M 1/34; H02M 1/44; H02M 3/33523; H02M 7/06; G03G 15/5004; G03G 15/80; G03G 15/0266; Y02B 70/10; B41J 29/38; H03K 17/163

See application file for complete search history.

(56) References Cited

U.S. PATENT DOCUMENTS 4,675,796 A * 6/1987 Gautherin ............. H02M 3/335
363/20
5,379,206 A * 1/1995 Davidson ........... H03K 17/0814
363/55
(Continued)

FOREIGN PATENT DOCUMENTS

JP      7-264851 A    10/1995
JP    2000-92834 A     3/2000
(Continued)

*Primary Examiner* — Yusef A Ahmed (57) ABSTRACT

A power source apparatus including: a transformer including a primary coil, a secondary coil, and an auxiliary coil, and has a primary side and a secondary side which are insulated from each other; a rectifier circuit including a first output terminal and a second output terminal; a smoothing capacitor; a switching element; a first series circuit having a capacitor and a first rectification element connected in series; and a second series circuit having a second rectification element and the auxiliary coil connected in series. The number of turns of the auxiliary coil is smaller than the number of turns of the primary coil. A product a ratio between the number of turns of the auxiliary coil and the number of turns of the secondary coil and an output voltage on the secondary side of the transformer is equal to or lower than a voltage of the smoothing capacitor.

4 Claims, 7 Drawing Sheets

(51) Int. Cl.
  *H02M 1/08* (2006.01)
  *H02M 1/34* (2007.01)
  *H02M 1/42* (2007.01)

(52) U.S. Cl.
  CPC ....... *H02M 1/346* (2021.05); *H02M 3/33507* (2013.01); *H02M 1/4258* (2013.01)

(56) References Cited

U.S. PATENT DOCUMENTS

| | | | | |
|---|---|---|---|---|
| 5,598,324 | A * | 1/1997 | Imamura | H02M 3/335 |
| | | | | 363/21.02 |
| 5,883,795 | A * | 3/1999 | Farrington | H02M 3/33538 |
| | | | | 363/21.04 |
| 6,005,780 | A * | 12/1999 | Hua | H02M 1/4258 |
| | | | | 363/20 |
| 6,061,253 | A * | 5/2000 | Igarashi | H02M 1/34 |
| | | | | 363/19 |
| 6,088,242 | A * | 7/2000 | Koegel | H02M 1/4258 |
| | | | | 363/20 |
| 6,115,271 | A * | 9/2000 | Mo | H02M 1/34 |
| | | | | 363/56.11 |
| 6,314,002 | B1 * | 11/2001 | Qian | H02M 3/33538 |
| | | | | 363/21.04 |
| 6,421,255 | B1 * | 7/2002 | Frebel | H02M 3/33538 |
| | | | | 363/21.04 |
| 6,466,463 | B1 * | 10/2002 | Morita | H02M 1/4258 |
| | | | | 363/21.16 |
| 6,473,318 | B1 * | 10/2002 | Qian | H02M 3/33569 |
| | | | | 363/21.16 |
| 6,496,389 | B1 * | 12/2002 | Yasumura | H02M 1/4258 |
| | | | | 363/21.04 |
| 7,630,219 | B2 * | 12/2009 | Lee | H02M 1/34 |
| | | | | 363/21.16 |
| 8,880,911 | B2 | 11/2014 | Karino | |
| 9,106,148 | B2 | 8/2015 | Uchiyama | |
| 9,304,478 | B2 | 4/2016 | Yayasaki | |
| 9,362,831 | B2 * | 6/2016 | Skinner | H02M 3/156 |
| 9,787,205 | B2 | 10/2017 | Kobayashi | |
| 10,547,244 | B2 * | 1/2020 | Odate | H02M 3/33592 |
| 11,165,351 | B1 * | 11/2021 | Yau | H02M 1/342 |
| 11,314,191 | B2 * | 4/2022 | Uchiyama | H02M 7/06 |
| 2002/0114176 | A1 * | 8/2002 | Morita | H02M 1/14 |
| | | | | 363/95 |
| 2003/0043602 | A1 * | 3/2003 | Morita | H02M 1/4258 |
| | | | | 363/24 |
| 2003/0142514 | A1 * | 7/2003 | Hosotani | H02M 3/3385 |
| | | | | 363/21.02 |
| 2003/0142521 | A1 * | 7/2003 | Hosotani | H02M 1/40 |
| | | | | 363/100 |
| 2005/0117371 | A1 * | 6/2005 | Imamura | H02M 1/4258 |
| | | | | 363/20 |
| 2005/0243492 | A1 * | 11/2005 | Imamura | H02M 1/4258 |
| | | | | 361/118 |
| 2006/0187688 | A1 * | 8/2006 | Tsuruya | H01F 27/38 |
| | | | | 363/56.12 |
| 2010/0247126 | A1 * | 9/2010 | Naganawa | G03G 15/0266 |
| | | | | 399/50 |
| 2011/0150521 | A1 * | 6/2011 | Uchiyama | G03G 15/80 |
| | | | | 399/88 |
| 2011/0205770 | A1 * | 8/2011 | Isogai | H02M 1/32 |
| | | | | 363/78 |
| 2012/0301172 | A1 * | 11/2012 | Odate | G03G 15/80 |
| | | | | 399/88 |
| 2013/0064566 | A1 * | 3/2013 | Kojima | H02M 3/33523 |
| | | | | 363/21.01 |
| 2013/0236206 | A1 * | 9/2013 | Shoji | H02M 3/33523 |
| | | | | 399/88 |
| 2013/0329469 | A1 * | 12/2013 | Kubota | H02M 3/33507 |
| | | | | 363/21.16 |
| 2014/0119065 | A1 * | 5/2014 | Sugahara | H02M 3/33523 |
| | | | | 363/21.13 |
| 2016/0359419 | A1 * | 12/2016 | Lin | H02M 3/33592 |
| 2018/0212508 | A1 * | 7/2018 | Kobayashi | G03G 15/5004 |
| 2018/0316269 | A1 * | 11/2018 | Shimura | H02M 3/33571 |
| 2019/0074761 | A1 * | 3/2019 | Matsuda | H02M 1/32 |
| 2019/0207530 | A1 * | 7/2019 | Hirose | H02M 1/36 |
| 2020/0112263 | A1 * | 4/2020 | Hayasaki | H02M 3/33592 |
| 2021/0124300 | A1 * | 4/2021 | Uchiyama | H02M 5/12 |
| 2022/0368806 | A1 * | 11/2022 | Hirano | H02M 1/346 |
| 2023/0135362 | A1 * | 5/2023 | Uchiyama | H02M 3/33507 |
| | | | | 363/21.02 |

FOREIGN PATENT DOCUMENTS

| | | |
|---|---|---|
| JP | 2001-145346 A | 5/2001 |
| JP | 2004-514398 A | 5/2004 |
| WO | 02/41482 A2 | 5/2002 |

* cited by examiner

POWER SOURCE APPARATUS AND IMAGE FORMING APPARATUS

BACKGROUND OF THE INVENTION

Field of the Invention

The present invention relates to a power source apparatus, and an image forming apparatus including the power source apparatus.

Description of the Related Art

In a switching power source using a switching element, when the switching element is turned off, a surge voltage is caused due to a leakage inductance of a transformer, an output capacitance of the switching element itself, and a peak current caused right before the turn-off. There has been proposed a switching power source with which this surge voltage is suppressed and the efficiency is improved. For example, in Japanese Patent Application Laid-Open No. 2004-514398, there is disclosed a technology of suppressing the surge voltage of the switching power source with a small circuit loss.

The related art has a problem in that, depending on a ratio between the number of turns of a primary coil and the number of turns of a clamp coil (hereinafter referred to as "ratio of the number of turns"), and on a ratio of the number of turns between a secondary coil and the clamp coil, the suppression of the surge voltage of the switching element and the efficiency improvement cannot be achieved. Further, in the related-art example, no consideration is given to the ratio of the number of turns between the primary coil and the clamp coil and the ratio of the number of turns between the secondary coil and the clamp coil.

SUMMARY OF THE INVENTION

The present invention has been made in view of the above-mentioned circumstances, and has an abject to improve efficiency of a power source apparatus using a switching element while suppressing generation of a surge voltage.

In order to solve the above-mentioned problems, according to an embodiment of the present invention, there is provided a power source apparatus comprising: a transformer which includes a primary coil, a secondary coil, and an auxiliary coil, and has a primary side and a secondary side which are insulated from each other; a rectifier circuit which includes a first output terminal and a second output terminal, and is configured to rectify an alternating-current voltage; a smoothing capacitor, of which one end is connected to the first output terminal and to one end of the primary coil, and of which another end is connected to the second output terminal; a switching element, of which one end is connected to another end of the primary coil, and of which another end is connected to the second output terminal, and which is configured to be switched between an on state and an off state; a first series circuit, in which a capacitor and a first rectification element are connected in series, and which is connected in parallel to the primary coil; and a second series circuit, in which a second rectification element and the auxiliary coil are connected in series, and which is connected between a connection point between the capacitor and the first rectification element and the another end of the switching element, wherein the transformer is configured so that a number of turns of the auxiliary coil is smaller than a number of turns of the primary coil, and a value obtained by multiplying a ratio between the number of turns of the auxiliary coil and a number of turns of the secondary coil by an output voltage on the secondary side of the transformer is equal to or lower than a voltage of the smoothing capacitor.

Further features of the present invention will become apparent from the following description of exemplary embodiments with reference to the attached drawings.

DESCRIPTION OF THE EMBODIMENTS

Now, detailed description will be provided of embodiments of the present invention with reference to the drawings.

First Embodiment

[Configuration of Image Forming Apparatus]

Figure 1:
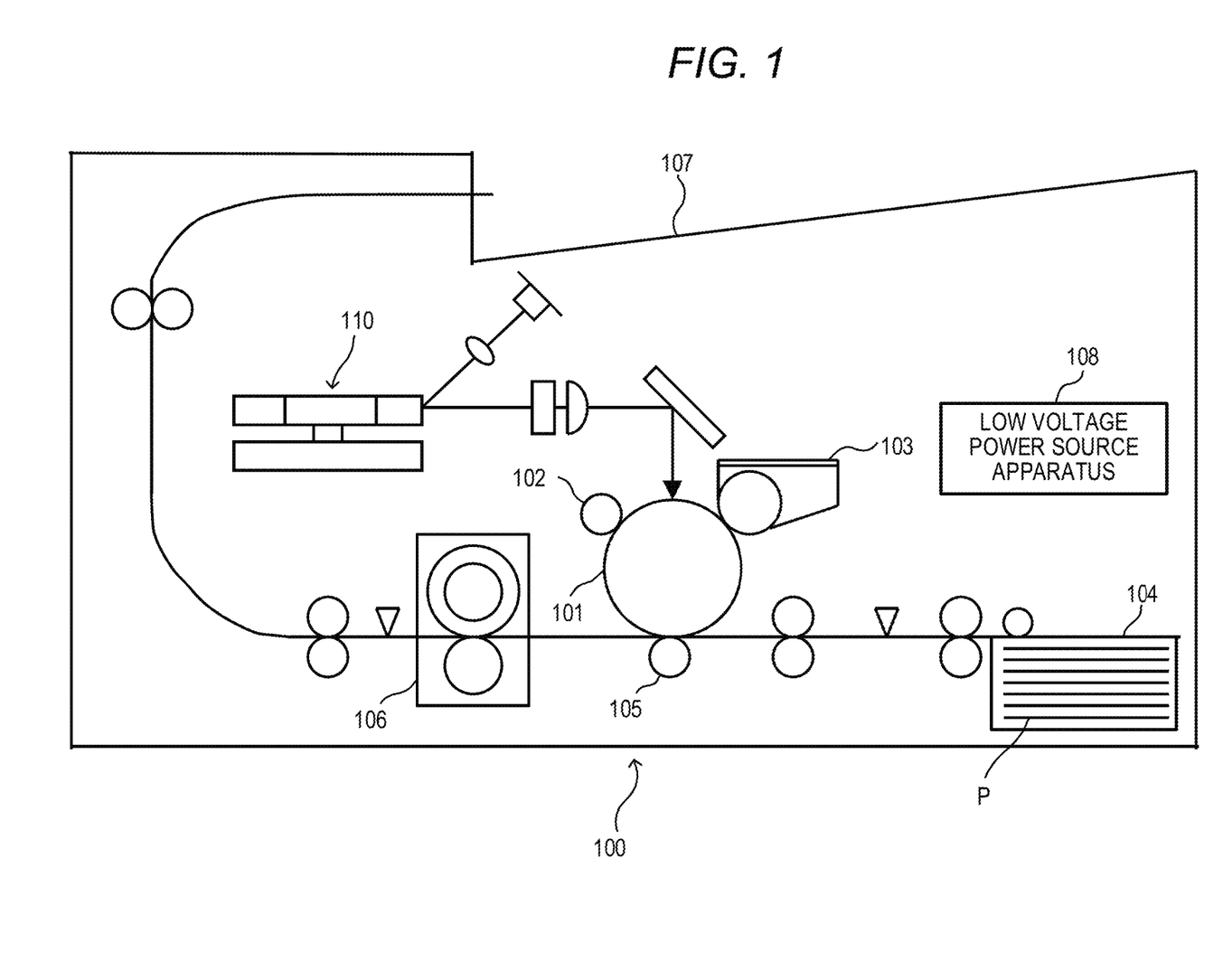
FIG. 1 is a sectional view for illustrating a configuration of an image forming apparatus according to each of a first embodiment to a third embodiment.

FIG. 1 is a sectional view for illustrating a configuration of a laser beam printer 100 as an example of an image forming apparatus. The laser beam printer 100 (hereinafter referred to as "printer 100") includes a photosensitive drum 101, a charging portion 102, and a developing portion 103. An electrostatic latent image is formed on the photosensitive drum 101. The charging portion 102 uniformly charges the photosensitive drum 101. The developing portion 103 develops the electrostatic latent image formed on the photosensitive drum 101 so as to form a toner image. Further, the printer 100 includes an exposure device 110 for irradiating the photosensitive drum 101 with laser light so as to form the electrostatic latent image on a surface of the photosensitive drum 101. In the printer 100, the toner image formed on the photosensitive drum 101 is transferred onto a sheet P by a transfer portion 105. The sheet P serves as a recording material, and is fed from a cassette 104. The sheet P having an unfixed toner image transferred thereon is conveyed to a fixing device 106, and the toner image is fixed to the sheet P by the fixing device 106. Then, the sheet having the toner image fixed thereto is delivered to a tray 107. The photosensitive drum 101, the charging portion 102, the developing portion 103, and the transfer portion 105 form an image forming portion (image forming unit). Further, the printer 100 includes a low voltage power source apparatus 108. The low voltage power source apparatus 108 supplies power to a control portion (not shown) for controlling an image forming operation and a conveying operation of the sheet P which are performed by the image forming portion and a drive portion, for example, a motor.

[Configuration of Switching Power Source Apparatus]

Figure 2:
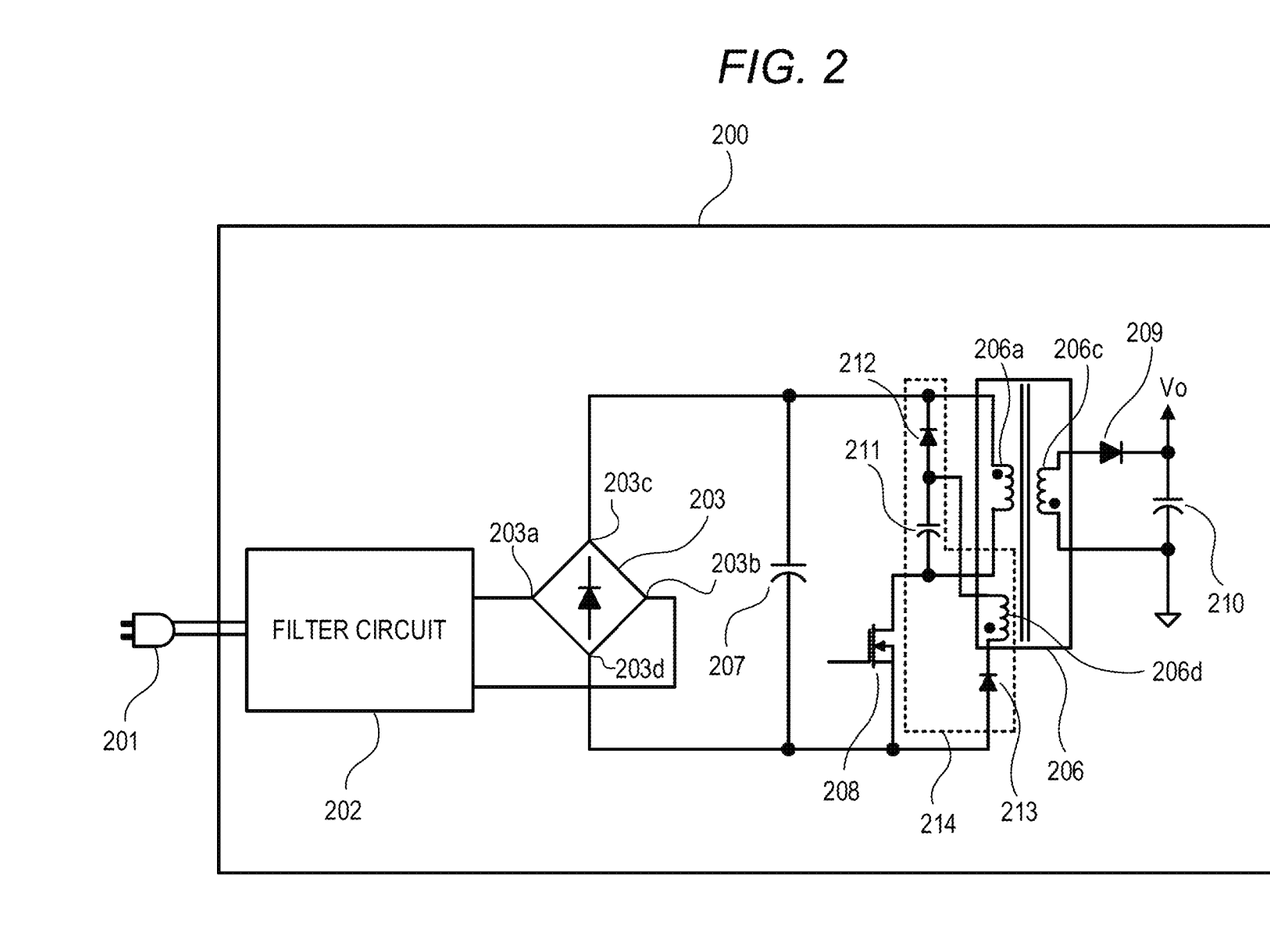
FIG. 2 is a circuit diagram for illustrating a circuit configuration of a switching power source according to the first embodiment.

FIG. 2 is a circuit diagram for illustrating a circuit configuration of a switching power source 200 corresponding to a power source apparatus according to the first embodiment. The switching power source 200 is included in the printer 100 of FIG. 1 as the low voltage power source apparatus 108. In FIG. 2, when a plug 201 is connected to an outlet, an alternating-current voltage is input from an alternating-current power source (not shown) to the switching power source 200. The input alternating-current voltage is input to a diode bridge 203 serving as a rectifier circuit via a filter circuit 202. The diode bridge 203 includes input-side terminals 203a and 203b, an output-side terminal 203c (first output terminal), and an output-side terminal 203d (second output terminal). The diode bridge 203 performs full wave rectification of the alternating-current voltage input from the input-side terminals 203a and 203b, and outputs the rectified voltage to the output-side terminals 203c and 203d. The output-side terminal 203c of the diode bridge 203 is connected to one end of a smoothing capacitor 207, and the terminal 203d is connected to another end of the smoothing capacitor 207. The alternating-current voltage subjected to the full wave rectification is smoothed by the smoothing capacitor 207 so as to become a substantially constant direct-current voltage.

A transformer 206 is an isolation transformer for converting the energy on a primary side to a secondary side, and includes a primary coil 206a, a secondary coil 206c, and an auxiliary coil 206d. FIG. 2 shows an application example to a flyback circuit, and hence a winding direction of the secondary coil 206c is opposite to that of the primary coil 206a (refer to the black circles of FIG. 2). Further, similarly to the secondary coil 206c, a winding direction of the auxiliary coil 206d is also opposite to that of the primary coil 206a (refer to the black circles of FIG. 2).

The one end of the smoothing capacitor 207 is connected to one end of the primary coil 206a of the transformer 206, and another end of the primary coil 206a is connected to a drain terminal of a field effect transistor (hereinafter referred to as "FET") 208 serving as a switching element. Further, a source terminal of the FET 208 is connected to the another end of the smoothing capacitor 207 and the output-side terminal 203d of the diode bridge 203. A gate terminal of the FET 208 is connected to a control IC (not shown) for controlling a switching operation of the FET 208.

Further, one end of the secondary coil 206c of the transformer 206 is connected to an anode terminal of a diode 209, and a cathode terminal of the diode 209 is connected to one end of a smoothing capacitor 210. The smoothing capacitor 210 includes the one end connected to the cathode terminal of the diode 209, and another end connected to another end of the secondary coil 206c of the transformer 206. A charged voltage of the smoothing capacitor 210 is output as an output voltage Vo of the switching power source 200 to an external load connected to the switching power source 200.

In FIG. 2, at a timing at which a low level signal is input from the control IC (not shown) to the gate terminal of the FET 208 so that the FET 208 is turned off, a large surge voltage is generated at the drain terminal of the FET 208. A circuit for suppressing the surge voltage is a snubber circuit 214 surrounded by the broken line. The snubber circuit 214 includes the auxiliary coil 206d of the transformer 206, two rectification elements, specifically, a diode 212 (first rectification element) and a diode 213 (second rectification element), and a clamp capacitor 211. In this case, a first series circuit in which the clamp capacitor 211 and the diode 212 are connected in series to each other is connected in parallel to the primary coil 206a. A second series circuit in which the diode 213 and the auxiliary coil 206d are connected in series to each other is connected between a connection point at which the clamp capacitor 211 and the diode 212 are connected to each other and another end (source terminal) of the FET 208. That is, the snubber circuit 214 includes the first series circuit and the second series circuit.

In the snubber circuit 214, one end of the clamp capacitor 211 is connected to the another end of the primary coil 206a of the transformer 206 and the drain terminal of the FET 208. Another end of the clamp capacitor 211 is connected to an anode terminal of the diode 212. A cathode terminal of the diode 212 is connected to the one end of the smoothing capacitor 207 and the one end of the primary coil 206a of the transformer 206. Further, an anode terminal of the diode 213 is connected to the source terminal of the FET 208, the another end of the smoothing capacitor 207, and the output-side terminal 203d of the diode bridge 203. Meanwhile, a cathode terminal of the diode 213 is connected to one end of the auxiliary coil 206d of the transformer 206. Another end of the auxiliary coil 206d of the transformer 206 is connected to the connection point at which the clamp capacitor 211 and the anode terminal of the diode 212 are connected to each other.

In the FET 208, when a high level signal is input from the control IC (not shown) to the gate terminal of the FET 208, conduction is achieved between the drain terminal and the source terminal of the FET 208, and the FET 208 is brought into a conductive state (on state). As a result, a current from the smoothing capacitor 207 flows through the primary coil 206a, and energy corresponding to a conduction period of the FET 208 is accumulated in the transformer 206. During a period in which the FET 208 is in the conductive state, in the secondary coil 206c of the transformer 206, a voltage which is positive on the winding start side and is negative on the winding end side is generated. However, the voltage of the anode terminal of the diode 209 on the secondary side of the transformer 206 is lower than the voltage of the cathode terminal thereof. Accordingly, the diode 209 remains in a non-conductive state, and no current flows from the secondary coil 206c via the diode 209.

Meanwhile, when a low level signal is input from the control IC (not shown) to the gate terminal of the FET 208, an open state is achieved between the drain terminal and the source terminal of the FET 208, and the FET 208 is brought into a non-conductive state (off state). Then, in the secondary coil 206c of the transformer 206, a voltage which is negative on the winding start side and is positive on the winding end side is generated. The voltage of the anode terminal of the diode 209 on the secondary side of the transformer 206 becomes higher than the voltage of the cathode terminal thereof. Accordingly, the diode 209 is brought into the conductive state, and a current flows from the secondary coil 206c of the transformer 206 through the secondary-side diode 209. As described above, in the secondary coil 206c, a pulsed voltage is generated in association with the switching operation of the FET 208. When the voltage generated in the secondary coil 206c of the transformer 206 is rectified by the diode 209 and smoothed by the smoothing capacitor 210, the output voltage Vo is generated, and the output voltage Vo is controlled to be a constant voltage by the switching operation of the FET 208.

[Operation of Snubber Circuit]

Figure 3A:
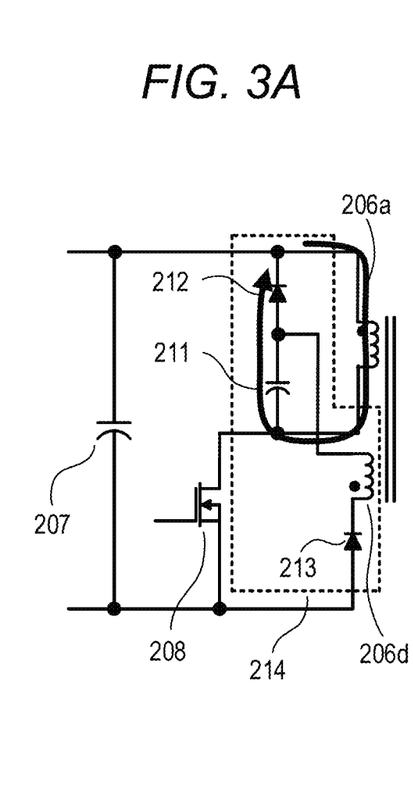
FIG. 3A, FIG. 3B, and FIG. 3C are diagrams for illustrating current routes in the first embodiment.
Figure 3B:
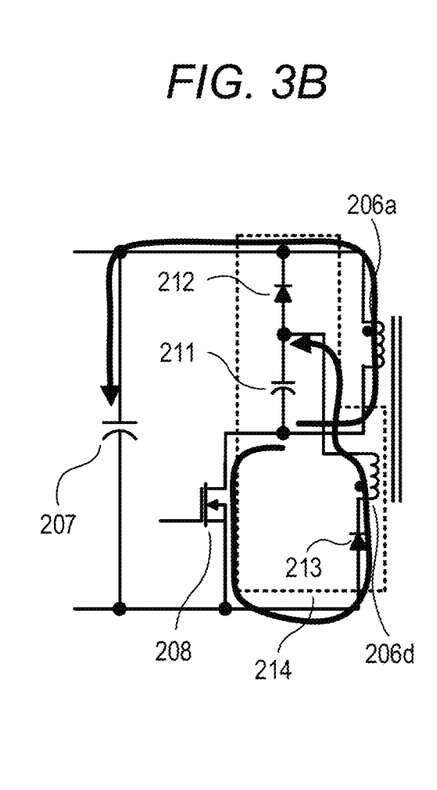
Figure 3C:
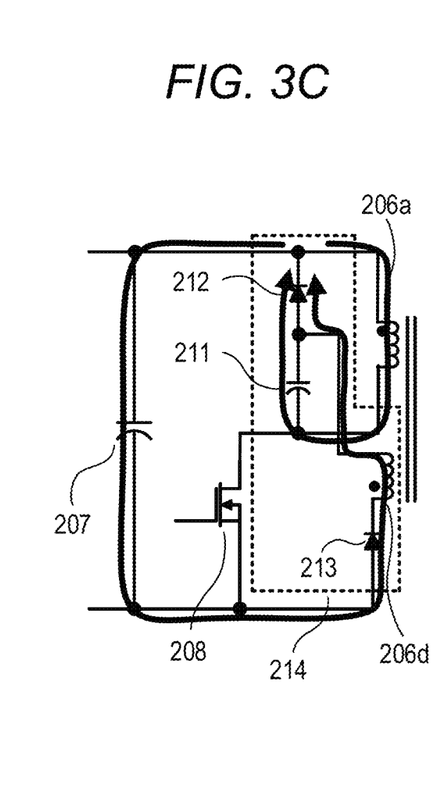

Next, an operation of the snubber circuit 214 is described with reference to the state explanatory diagrams of FIG. 3A, FIG. 3B, and FIG. 3C. FIG. 3A, FIG. 3B, and FIG. 3C are circuit diagrams obtained by extracting a surrounding circuit of the snubber circuit 214 of FIG. 2 in order to describe the operation of the snubber circuit 214. FIG. 3A is a diagram for illustrating a circuit operation performed immediately after the FET 208 is turned off (immediately after switching from the on state to the off state), and FIG. 3B is a diagram for illustrating a circuit operation performed immediately after the FET 208 is turned on (immediately after switching from the off state to the on state). The snubber circuit 214 in the first embodiment has a feature in the circuit operations performed immediately after the FET 208 is turned off and immediately after the FET 208 is turned on in terms of the circuit operation. The circuit operation in periods other than the periods immediately after the FET 208 is turned off and immediately after the FET 208 is turned on is the same as the circuit operation of a general switching power source not including the above-mentioned snubber circuit 214, and hence description thereof is omitted here.

(Circuit Operation Performed Immediately after FET 208 is Turned Off)

First, with reference to FIG. 3A, the circuit operation performed immediately after the FET 208 is turned off is described. When a low level signal is input from the control IC (not shown) to the gate terminal of the FET 208, an open state is achieved between the drain terminal and the source terminal of the FET 208. Then, a current which has been flowing so far from the primary coil 206a to the drain terminal of the FET 208 starts to flow to the clamp capacitor 211, and the clamp capacitor 211 is charged by the current from the primary coil 206a (hereinafter referred to as "charging current"). A path of the charging current to the clamp capacitor 211 (hereinafter referred to as "current route") is a route indicated by the thick arrow of FIG. 3A, and the charging current flows from the primary coil 206a to the clamp capacitor 211 and then to the diode 212. A drain voltage of the FET 208 at that time has a voltage waveform which draws an arc due to a resonant operation between a capacitance of the clamp capacitor 211 and an inductance of the primary coil 206a. Thus, the voltage gradually rises, and abrupt rise of the voltage is restricted.

(Circuit Operation Performed Immediately after FET 208 is Turned on)

Meanwhile, when a high level signal is input from the control IC (not shown) to the gate terminal of the FET 208, a conductive state is achieved between the drain terminal and the source terminal of the FET 208. This state is shown in FIG. 3B. The thick arrow of FIG. 3B shows a current route of a current discharged from the clamp capacitor 211 (hereinafter referred to as "discharged current"). The primary coil 206a and the auxiliary coil 206d are coupled to each other in the transformer 206. Accordingly, depending on a ratio of the number of turns between the primary coil 206a and the auxiliary coil 206d, the discharged current flowing from the clamp capacitor 211 is divided into a current flowing through the FET 208 and a current backflowing through the primary coil 206a. The current backflowing through the primary coil 206a becomes a regeneration current flowing into the smoothing capacitor 207, and part of energy (charged voltage of the clamp capacitor 211) generated by the surge voltage at the time when the FET 208 is turned off is regenerated in the smoothing capacitor 207 so as to be reused. Then, the clamp capacitor 211 in which the voltage charged by the surge voltage is discharged due to the flowing of the discharged current is brought into a state immediately before the charging current flows as illustrated in FIG. 3A, and is reset to a state in which the energy generated by the surge voltage can be accumulated again.

Meanwhile, the current flowing from the clamp capacitor 211 to the FET 208 flows to the auxiliary coil 206d via the diode 213, and the energy of the discharged current is accumulated in the auxiliary coil 206d. Then, the energy accumulated in the auxiliary coil 206d is converted as a secondary-side current when the FET 208 is turned off next time, to thereby be added to the secondary-side current obtained by converting the energy accumulated in the primary coil 206a. The diode 213 has a function of blocking the discharge of the charges of the clamp capacitor 211 through the auxiliary coil 206d. Further, the diode 213 and the auxiliary coil 206d are connected in the order of the diode 213 and the auxiliary coil 206d in the direction in which the discharged current from the clamp capacitor 211 flows, but the same circuit operation is achieved even when the diode 213 and the auxiliary coil 206d are connected in the order of the auxiliary coil 206d and the diode 213. That is, in FIG. 2, the anode terminal of the diode 213 is connected to the source terminal of the FET 208, the cathode terminal of the diode 213 is connected to the one end of the auxiliary coil 206d, and the another end of the auxiliary coil 206d is connected to the above-mentioned connection point. However, the one end of the auxiliary coil 206d may be connected to the source terminal of the FET 208, the another end of the auxiliary coil 206d may be connected to the anode terminal of the diode 213, and the cathode terminal of the diode 213 may be connected to the connection point.

(Consideration of Ratio of Number of Turns)

Next, consideration is given to the ratio of the number of turns between the primary coil 206a and the auxiliary coil 206d of the transformer 206, and the ratio of the number of turns between the secondary coil 206c and the auxiliary coil 206d.

(1. Ratio of Number of Turns Between Primary Coil 206a and Auxiliary Coil 206d)

As described above, the discharged current of the clamp capacitor 211 immediately after the FET 208 is turned on is determined based on the ratio of the number of turns between the primary coil 206a and the auxiliary coil 206d, and is divided into the current backflowing through the primary coil 206a and the current flowing through the FET 208. In this case, when the number of turns of the primary coil 206a is represented by "np", the current flowing through the primary coil 206a is represented by I1, the number of turns of the auxiliary coil 206d is represented by "nc", and the current flowing through the auxiliary coil 206d is represented by I2, the relationship between the current I1 and the current I2 is expressed by the following expression (1).

$$I1 = nc/np \times I2 \qquad \text{Expression (1)}$$

When the number of turns "nc" and the number of turns "np" are the same (nc=np), the current I1 and the current I2 are the same (I1=I2). This condition represents that, although the FET 208 is short-circuited, no current at all flows through the FET 208, and a current flows through only the primary coil 206a.

This state is phenomenally impossible. Thus, a condition in which the number of turns "nc" and the number of turns "np" are the same (nc=np) is a condition in which no discharged current of the clamp capacitor 211 flows, and represents a state in which surge energy cannot be efficiently used. Further, in a condition in which the number of turns "nc" of the auxiliary coil 206d is larger than the number of turns "np" of the primary coil 206a (nc>np), the current I1 flowing through the primary coil 206a is larger than the current I2 flowing through the auxiliary coil 206d (I1>I2). This condition is also impossible in principle. That is, the relationship between the number of turns "nc" and the number of turns "np" is required to be set so that the number of turns "np" of the primary coil 206a is larger than the number of turns "nc" of the auxiliary coil 206d as expressed by the following expression (2).

$$nc < np \quad \text{Expression (2)}$$

(2. Ratio of Number of Turns Between Auxiliary Coil 206d and Secondary Coil 206c)

The operation intended by this circuit is to cause only the charging current of the clamp capacitor 211 illustrated in FIG. 3A to flow immediately after the FET 208 is turned off. However, depending on the ratio of the number of turns between the auxiliary coil 206d and the secondary coil 206c, a current other than this current flows. This state is shown in FIG. 3C. The auxiliary coil 206d and the secondary coil 206c are also coupled to each other in the transformer 206. Accordingly, in the auxiliary coil 206d at the time when the FET 208 is in the off state, a voltage corresponding to a multiple of the ratio of the number of turns between the auxiliary coil 206d and the secondary coil 206c with respect to the output voltage Vo is generated. When this voltage is equal to or lower than the voltage of the smoothing capacitor 207, only the current illustrated in FIG. 3A flows, but when the voltage generated in the auxiliary coil 206d is higher than the voltage of the smoothing capacitor 207, a current illustrated in FIG. 3C is additionally generated. Thus, the circuit is brought into a state in which the circuit does not operate as desired. Accordingly, the ratio nc/ns of the number of turns, where "nc" represents the number of turns of the auxiliary coil 206d and "ns" represents the number of turns of the secondary coil 206c, is required to satisfy the following expression (3) when a voltage of the smoothing capacitor 207 is represented by Vin.

$$Vin \geq Vo \times nc/ns \quad \text{Expression (3)}$$

(100-Volt Area)

In the following, description is given through use of specific numerical values. An input voltage of the switching power source 200 varies depending on countries, which are roughly divided into a 100-volt area and a 200-volt area. First, the switching power source 200 dedicated to the 100-volt area is considered. In the following description, when the voltage value of the alternating-current voltage is to be represented, the voltage value is described as, for example, AC 100 V. The voltage in the 100-volt area is an alternating-current voltage of roughly from AC 100 V to AC 127 V. In consideration of a power source circumstance and a momentary voltage reduction under this condition, the input voltage of the switching power source 200 is required to be designed to be about AC 70 V as a lower limit. When the input voltage is AC 70 V, the charged voltage of the smoothing capacitor 207 is about 100 V.

Figure 4A:
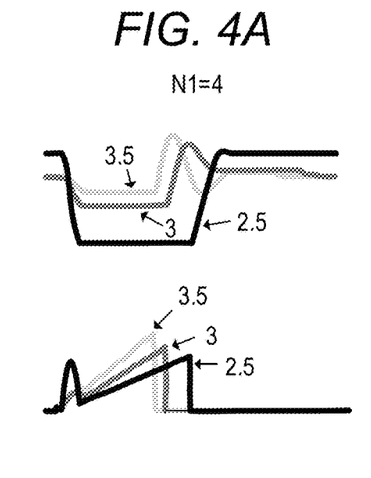
FIG. 4A, FIG. 4B, FIG. 4C, FIG. 4D, FIG. 4E, and FIG. 4F are diagrams for illustrating operation waveforms in the first embodiment.
Figure 4B:
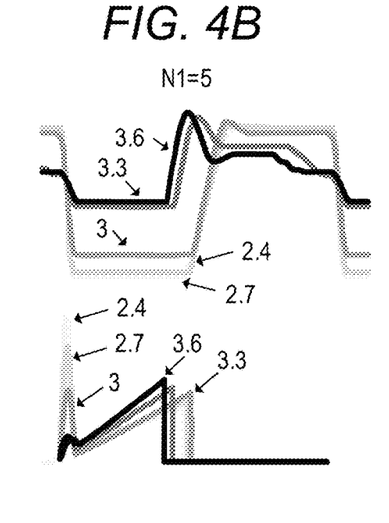
Figure 4C:
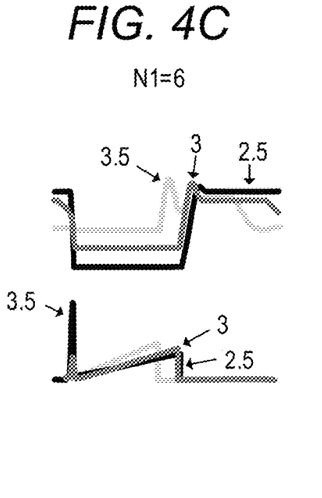

Meanwhile, the output voltage Vo to be generally used in the printer 100 is about 25 V. In this case, in order to satisfy the expression (3), nc/ns, that is, the ratio of the number of turns between the auxiliary coil 206d and the secondary coil 206c is required to be 4 or less. Meanwhile, a trouble is caused when this ratio of the number of turns is excessively low. FIG. 4A, FIG. 4B, and FIG. 4C are verification waveforms obtained at the time of changing, when the ratio (represented by np/ns=N1) of the number of turns between the primary coil 206a and the secondary coil 206c is changed from 4 to 6, the ratio (represented by nc/ns=N2) of the number of turns between the auxiliary coil 206d and the secondary coil 206c as well. Further, the numbers shown in FIG. 4A to FIG. 4F indicate the values of the ratio N2 of the number of turns. Further, a waveform on the upper side of FIG. 4A to FIG. 4F is a voltage waveform of the clamp capacitor 211, and a waveform on the lower side thereof is a current waveform of the FET 208.

In the voltage waveform of the clamp capacitor 211, depending on the off period of the FET 208 and conditions, a change is caused in the voltage, and the surge energy to be charged during this period may be discharged.

In order to determine whether or not this easily discharged state is entered, observation of the voltage waveform of the clamp capacitor 211 is required. The voltage waveform of the clamp capacitor 211 is ideally a rectangular wave, and it is preferred that no ringing occurs. When the power source dedicated to the 100-volt area is designed, it is general to set the ratio N1 of the number of turns to from around 4 to around 6. When the ratio N1 of the number of turns is decreased to be lower than 4, the withstanding voltage of the diode 209 is required to be increased. Thus, a Schottky diode having a low voltage drop Vf cannot be used, and the cost of the component itself is increased.

Further, when the ratio N1 of the number of turns is increased to be larger than 6, the withstanding voltage of the FET 208 is required to be increased, and the cost of the component is increased as well. Accordingly, this verification is carried out while changing the ratio N1 of the number of turns from 4 to 6. In any of the conditions, as described above, the ratio of the number of turns between the number of turns "ns" of the secondary coil 206c and the number of turns "nc" of the auxiliary coil 206d is required to be set to 4 or less.

(N1=4)

In FIG. 4A, a condition in which the ratio N1 of the number of turns is 4 is checked. At the time of this condition, in a condition in which the ratio N2 of the number of turns is 2.5, which is indicated by the black line, the voltage waveform of the clamp capacitor 211 is a substantially rectangular wave, and is close to an ideal wave. Further, in conditions in which the ratio N2 of the number of turns is 3 and the ratio N2 of the number of turns is 3.5, which are indicated by the dark gray line and the light gray line, respectively, slight ringing is caused, but the clamp capacitor 211 is not in a completely discharged state, and hence there is no problem in terms of operation. The determination on whether or not the clamp capacitor 211 is completely discharged may be made as follows. That is, it is only required that the voltage of the clamp capacitor 211 charged at the time when the FET 208 is in the off state be higher even a little than the voltage of the clamp capacitor 211 during a period in which the clamp capacitor 211 is discharged and the drain current of the FET 208 flows. From the above, it can be determined that, at the time of the condition in which the ratio N1 of the number of turns is 4, there is no problem in terms of operation as long as the ratio N2 of the number of turns is from 2.5 to 3.5.

(N1=5)

Next, a condition in which the ratio N1 of the number of turns is 5 (FIG. 4B) is checked. First, when the voltage waveform of the clamp capacitor 211 is checked, the voltage waveform of the clamp capacitor 211 has a rectangular wave shape and is an ideal wave in conditions in which the ratio N2 of the number of turns is 2.4 and 2.7. However, when the current waveform of the FET 208 is checked, in the conditions in which the ratio N2 of the number of turns is 2.4 and 2.7, the surge current flowing when the FET 208 is turned on is excessive, and a switching loss of the FET 208 is caused. Accordingly, it can be determined that, in the condition in which the ratio N1 of the number of turns is 5, the condition in which the ratio N2 of the number of turns is 3 or more is preferred. As the surge current flowing when the FET 208 is turned on, the drain current flowing immediately before the FET 208 is turned off is determined as an upper limit. When the surge current is suppressed so as to be equal to or lower than the maximum value of the drain current, it is only required to consider only the drain current flowing immediately before the FET 208 is turned off even at the time of confirming a safe operation area of the FET 208, and it is not required to cause the current rating to match the surge current. Further, the reason why the surge current is increased when the ratio N2 of the number of turns is decreased is clear also from the expression (2). That is, it is because decreasing of the ratio N2 of the number of turns is equivalent to reducing of the number of turns "nc" of the auxiliary coil 206d, and almost all of the current amount of the current I2 corresponding to the discharged current of the clamp capacitor 211 flows to the FET 208 side.

(N1=6)

Next, a condition in which the ratio N1 of the number of turns is 6 is checked (FIG. 4C). When the voltage waveform of the clamp capacitor 211 is similarly checked, in the condition in which the ratio N2 of the number of turns is 2.5, the waveform shape is a rectangular wave shape and is an ideal shape, but when the current waveform of the FET 208 is checked, the surge current flowing when the FET 208 is turned on is excessive, which is not preferred. When the capacitance of the clamp capacitor 211 can be decreased so that the accumulated surge energy is decreased, the surge current can be decreased. However, this condition in which the ratio N2 of the number of turns is 2.5 can be said as a condition close to the limit in terms of operation. Thus, it can be determined that, in the condition in which the ratio N1 of the number of turns is 6, the conditions in which the ratio N2 of the number of turns is from 2.5 to 3.5 are preferred when the determination is made in consideration of a state up to a limit state usable from both of the voltage waveform of the clamp capacitor 211 and the current waveform of the FET 208.

As described above, it can be determined that, in the switching power source dedicated to the 100-volt area, the conditions in which the ratio N1 of the number of turns is from 4 to 6 and the ratio N2 of the number of turns is 2.5 or more and 3.5 or less are preferred.

(200-Volt Area)

Figure 4D:
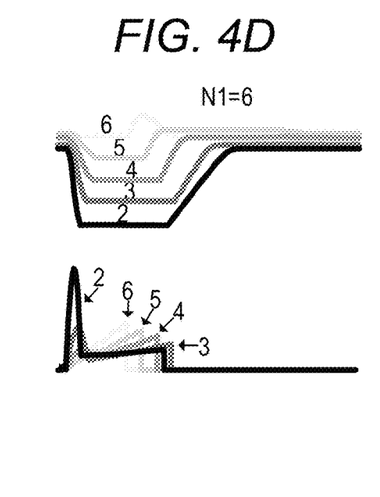
Figure 4E:
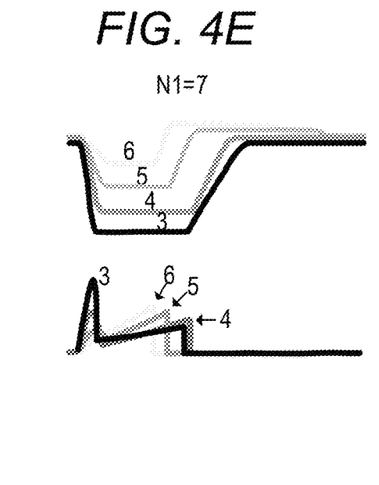
Figure 4F:
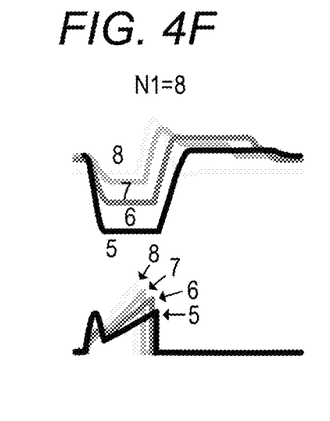

Next, the switching power source 200 for the 200-volt area is considered with reference to FIG. 4D, FIG. 4E, and FIG. 4F. The voltage in the 200-volt area is roughly from AC 220 V to AC 240 V. In consideration of a power source circumstance and a momentary voltage reduction under this condition, the input voltage of the switching power source 200 is required to be designed to be about AC 160 V as a lower limit. When the input voltage is AC 160 V, the charged voltage of the smoothing capacitor 207 is about 225 V. Meanwhile, the output voltage Vo to be generally used in the printer 100 is about 25 V, which is similar to the switching power source 200 dedicated to the 100-volt area. In this case, in order to satisfy the expression (3), nc/ns, that is, the ratio N2 of the number of turns is required to be 9 or less.

Next, the limit value for the ratio N2 of the number of turns is verified. In the case of the switching power source 200 dedicated to the 200-volt area, the ratio N1 of the number of turns is changed from 6 to 8. Similarly to the conditions of the switching power source 200 dedicated to the 100-volt area, when the ratio N1 of the number of turns is decreased to be lower than 6, the withstanding voltage of the diode 209 is required to be increased. As a result, a Schottky diode having a low voltage drop Vf cannot be used, and the cost of the component itself is increased. Further, when the ratio N1 of the number of turns is increased to be larger than 8, the withstanding voltage of the FET 208 is required to be increased, and the cost of the component is increased as well. Accordingly, this verification is carried out while changing the ratio N1 of the number of turns from 6 to 8. In any of the conditions, as described above, the ratio of the number of turns between the secondary coil 206c and the auxiliary coil 206d is required to be set to 9 or less.

(N1=6)

FIG. 4D, FIG. 4E, and FIG. 4F show verification results in cases in which the ratio N2 of the number of turns is changed in conditions in which the ratio N1 of the number of turns of the switching power source 200 dedicated to the 200-volt area is from 6 to 8. First, a condition in which the ratio N1 of the number of turns is 6 is checked. Similarly to the verification of the switching power source 200 dedicated to the 100-volt area described above, the determination is made based on the voltage waveform of the clamp capacitor 211 being the upper-side waveform and the current waveform of the FET 208 being the lower-side waveform. In a condition in which the ratio N2 of the number of turns is 2 (FIG. 4D), the surge current flowing when the FET 208 is turned on is excessive. Thus, it can be determined that it is preferred to set the ratio N2 of the number of turns to 3 or more.

(N1=7, 8)

Next, a condition in which the ratio N1 of the number of turns is 7 (FIG. 4E) is checked. At the time of this condition, in a condition in which the ratio N2 of the number of turns is 3, the surge current is excessive. Thus, it can be determined that it is preferred to set the ratio N2 of the number of turns to 4 or more. Further, a case in which the ratio N1 of the number of turns is 8 is checked (FIG. 4F). In this case, it can be determined that there is no problem as long as the ratio N2 of the number of turns is 5 or more.

As described above, it can be determined that, in the switching power source 200 dedicated to the 200-volt area, the conditions in which the ratio N1 of the number of turns is from 6 to 8 and the ratio N2 of the number of turns is 3 or more are preferred. When the switching power source 200 is designed as a universal specification that can handle from AC 100 V to AC 200 V, the input voltage is required to adapt to the 100-volt system voltage being the lower limit, and hence the same idea as that for the switching power source 200 dedicated to the 100-volt area can be applied.

As described above, when the surge voltage (surge energy) caused by the FET 208 is accumulated in the clamp capacitor 211 immediately after the FET 208 is turned off, the surge voltage can be suppressed. Further, when the FET 208 is turned on, part of the discharged current obtained by discharging the voltage charged in the clamp capacitor 211 can be regenerated in the smoothing capacitor 207 so that the surge voltage (surge energy) can be reused. Further, part of the discharged current can be accumulated in the auxiliary coil 206d as energy so as to be converted into a secondary-side current. That is, the current from the clamp capacitor 211 flows through the smoothing capacitor 207 and the auxiliary coil 206d via the primary coil 206a depending on the ratio of the number of turns between the primary coil 206a and the auxiliary coil 206d.

Further, in addition to the condition of the configuration in which the number of turns "np" of the primary coil 206a is larger than the number of turns "nc" of the auxiliary coil 206d, in the switching power source 200 dedicated to the 100-volt area, there are set conditions in which the ratio N1 of the number of turns is from 4 to 6 and the ratio N2 of the number of turns is from 2.5 to 4. Further, in the switching power sources 200 dedicated to the 200-volt area and in a universal specification, there are set conditions in which the ratio N1 of the number of turns is from 6 to 8 and the ratio N2 of the number of turns is 3 or more. In this manner, the switching power source 200 having a satisfactory power source conversion efficiency can be achieved while the surge voltage of the FET 208 is suppressed. In the first embodiment, the flyback-type switching power source apparatus has been described, but it is needless to say that a forward-type switching power source apparatus can obtain similar effects.

In the first embodiment, the transformer 206 is configured so that the number of turns of the auxiliary coil 206d is smaller than the number of turns of the primary coil 206a, and a value obtained by multiplying the ratio between the number of turns of the auxiliary coil 206d and the number of turns of the secondary coil 206c by the output voltage is equal to or lower than the voltage of the smoothing capacitor 207.

As described above, according to the first embodiment, while the generation of the surge voltage is suppressed, the efficiency of the power source apparatus using the switching element can be improved.

Second Embodiment

In the first embodiment, the embodiment of the snubber circuit applied to the flyback-type switching power source apparatus has been described. In a second embodiment, an embodiment of a snubber circuit applied to an insulated switching power source capable of improving a power factor is described.

[Configuration of Switching Power Source]

Figure 5:
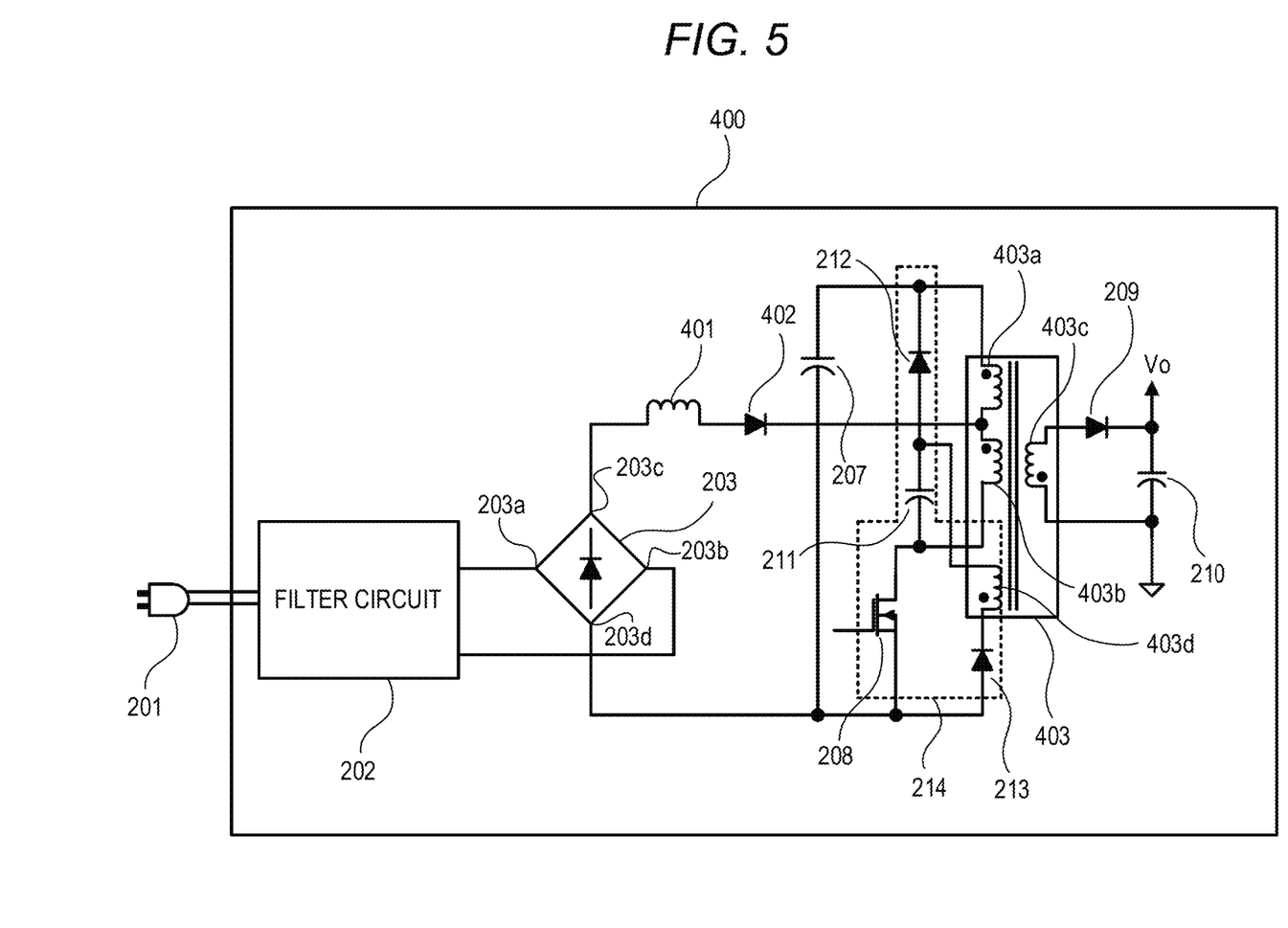
FIG. 5 is a circuit diagram for illustrating a circuit configuration of a switching power source according to the second embodiment.

FIG. 5 is a circuit diagram for illustrating a circuit configuration of a switching power source 400 capable of improving a power factor, in which a snubber circuit 214 in the second embodiment is applied. In the switching power source 200 according to the first embodiment, the smoothing capacitor 207 is connected at the subsequent stage (on the downstream side) of the diode bridge 203. Meanwhile, the switching power source 400 according to the second embodiment includes a power factor improving circuit, and hence the smoothing capacitor 207 is formed on the downstream side of primary coils 403a and 403b of a transformer 403. In the switching power source 400, components having the same configurations as those of the flyback-type switching power source 200 according to the first embodiment are denoted by the same reference symbols, and description thereof is omitted here.

Further, in the switching power source 400, description of the same circuit operation as that of the switching power source 200 according to the first embodiment is omitted.

In the switching power source 400 according to the second embodiment, an input-side inductor 401 and a diode 402 corresponding to a third rectification element are added to the switching power source 200 according to the first embodiment, and the transformer 206 is changed to the transformer 403. The transformer 206 of the switching power source 200 according to the first embodiment includes the primary coil 206a, the secondary coil 206c, and the auxiliary coil 206d. Meanwhile, the transformer 403 in the second embodiment includes two primary coils connected in series to each other, specifically, a first primary coil 403a (hereinafter simply referred to as "primary coil 403a") and a second primary coil 403b (hereinafter simply referred to as "primary coil 403b"). Further, the transformer 403 includes a secondary coil 403c and an auxiliary coil 403d. The transformer 403 is different from the transformer 206 in including two primary coils.

In FIG. 5, the output-side terminal 203c of the diode bridge 203 is connected to one end of the inductor 401. Another end of the inductor 401 is connected to an anode terminal of the diode 402, and a cathode terminal of the diode 402 is connected to the primary coil 403a and the primary coil 403b of the transformer 403. As described above, the inductor 401 and the diode 402 are connected in series to each other so as to form a third series circuit.

The primary coil 403a and the primary coil 403b of the transformer 403 are connected in series to each other. One end of the primary coil 403a is connected to the one end of the smoothing capacitor 207, and another end of the primary coil 403a is connected to one end of the primary coil 403b and the cathode terminal of the diode 402. Another end of the primary coil 403b is connected to the drain terminal of the FET 208, and the source terminal of the FET 208 is connected to the another end of the smoothing capacitor 207 and the output-side terminal 203d of the diode bridge 203. Further, the gate terminal of the FET 208 is connected to the control IC (not shown), and the FET 208 is set to the on state or the off state in accordance with a signal input from the control IC to the gate terminal. With the above-mentioned connection configuration, the smoothing capacitor 207 is connected in parallel to the primary coil 403a and the primary coil 403b of the transformer 403, which are connected in series to each other.

Further, one end of the secondary coil 403c of the transformer 403 is connected to the anode terminal of the diode 209, and the cathode terminal of the diode 209 is connected to the one end of the smoothing capacitor 210. The smoothing capacitor 210 includes the one end connected to the cathode terminal of the diode 209, and the another end connected to another end of the secondary coil 403c of the transformer 403. The charged voltage of the smoothing capacitor 210 is output as the output voltage Vo of the switching power source 400 to the external load connected to the switching power source 400.

Further, the snubber circuit 214 in the second embodiment includes, similarly to the first embodiment, the auxiliary coil 403d, the two diodes 212 and 213, and the clamp capacitor 211. In the snubber circuit 214, the one end of the clamp capacitor 211 is connected to the another end of the primary coil 403b of the transformer 403 and the drain terminal of the FET 208, and the another end of the clamp capacitor 211 is connected to the anode terminal of the diode 212. The cathode terminal of the diode 212 is connected to the one end of the smoothing capacitor 207 and the one end of the primary coil 403a of the transformer 403. Further, the anode terminal of the diode 213 is connected to the source terminal of the FET 208, the another end of the smoothing capacitor 207, and the output-side terminal 203d of the diode bridge 203. Meanwhile, the cathode terminal of the diode 213 is connected to one end of the auxiliary coil 403d of the transformer 403. Another end of the auxiliary coil 403d of the transformer 403 is connected to a first connection point (hereinafter simply referred to as "connection point") at which the clamp capacitor 211 and the anode terminal of the diode 212 are connected to each other. A second series circuit in which the diode 213 and the auxiliary coil 403d are connected in series to each other is connected between the connection point at which the clamp capacitor 211 and the diode 212 are connected to each other and another end (source terminal) of the FET 208.

As described above, the FET 208 is brought into the on state or the off state in accordance with the voltage applied from the control IC (not shown) to the gate terminal of the FET 208. When the FET 208 is brought into the on state, a voltage at a second connection point (hereinafter simply referred to as "connection point") at which the primary coil 403a and the primary coil 403b of the transformer 403 are connected to each other becomes the following voltage. That is, the voltage at the second connection point becomes a voltage obtained by dividing the charged voltage of the smoothing capacitor 207 by the ratio of the number of turns between the primary coils 403a and 403b.

The divided voltage is also a voltage on the cathode terminal side of the diode 402. At this time, when the output voltage of the output-side terminal 203c of the diode bridge 203 is higher than the divided voltage, an output current flows from the output-side terminal 203c of the diode bridge 203 in the following current route. That is, the output current from the output-side terminal 203c of the diode bridge 203 passes through the inductor 401, the diode 402, the primary coil 403b, and the FET 208 to flow to the output-side terminal 203d of the diode bridge 203. Meanwhile, when the divided voltage is higher than the output voltage of the output-side terminal 203c of the diode bridge 203, no output current flows from the output-side terminal 203c of the diode bridge 203. Then, the output voltage of the diode bridge 203 is clamped at the voltage obtained by dividing the charged voltage of the smoothing capacitor 207 by the ratio of the number of turns between the primary coils 403a and 403b.

As described above, when the FET 208 is in the on state, the voltage at the connection point at which the primary coil 403a and the primary coil 403b of the transformer 403 are connected to each other is a voltage obtained by dividing the charged voltage of the smoothing capacitor 207 by the ratio of the number of turns between the primary coils 403a and 403b. Accordingly, when the number of turns of the primary coil 403a is set to be larger than the number of turns of the primary coil 403b, the divided voltage is decreased. Thus, even when the output voltage of the diode bridge 203 is a lower voltage, the output current flows from the output-side terminal 203c. Further, when the external load (not shown) connected to the switching power source 400 is substantially constant, and the output voltage Vo is stable, the charged voltage of the smoothing capacitor 207 is a substantially constant voltage, and hence the divided voltage is also a substantially constant voltage. In the diode bridge 203, the alternating-current voltage being a sine wave is subjected to full wave rectification, and hence the output voltage of the output-side terminal 203c of the diode bridge 203 is changed to have a sine wave shape. Thus, the waveform of the output current of the terminal 203c is also changed to have a substantial sine wave shape. Accordingly, the switching power source 400 can obtain a power source characteristic having a high power factor.

[Relationship between Output Voltage of Diode Bridge and Input Current of Transformer]

Figure 6A:
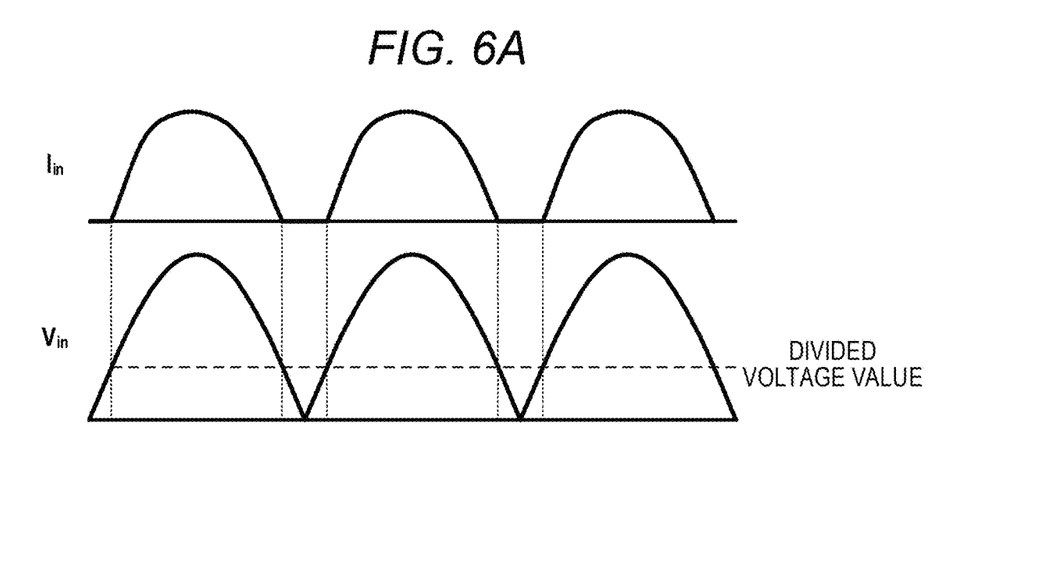
FIG. 6A is a diagram for illustrating an input current waveform and an input voltage waveform in the second embodiment.

FIG. 6A is a diagram for illustrating a relationship between an input current Iin and an output voltage Vin, where Iin represents the input current to the primary coils 403a and 403b of the transformer 403 and Vin represents the output voltage of the terminal 203c of the diode bridge 203. In FIG. 6A, the upper-side waveform diagram shows a current waveform of the input current Iin, and the lower-side waveform diagram shows a voltage waveform of the output voltage Vin. The horizontal axis represents time. In the output voltage Vin of FIG. 6A, the divided voltage value indicated by the broken line is the voltage at the connection point between the primary coil 403a and the primary coil 403b, which is obtained by dividing the voltage of the smoothing capacitor 207 by the numbers of turns of the primary coil 403a and the primary coil 403b. At a time point at which the output voltage Vin of the output-side terminal 203c of the diode bridge 203 exceeds the voltage having the divided voltage value illustrated in FIG. 6A, the input current Iin flows. In other words, the circuit of the switching power source 400 is configured so that no input current Iin flows until the output voltage Vin reaches the divided voltage value, and as illustrated in FIG. 6A, no input current Iin flows during a period in which the output voltage Vin is lower than the divided voltage value. However, the switching power source 400 can obtain a power factor of around 90% even under the state of the input current Iin illustrated in FIG. 6A. Accordingly, the power factor of the switching power source 400 according to the second embodiment is greatly improved as compared to 50% to 60% being a power factor of a switching power source having a general capacitor input configuration.

In the configuration of FIG. 5, the output voltage Vo is to be momentary changed due to conditions such as the ratio of the number of turns between the secondary coil 403c and the primary coils 403a and 403b, the input voltage, and the load current. The control IC (not shown) of the switching power source 400 changes an on duty being the time of the on state of the FET 208 based on a feedback signal from a feedback circuit (not shown) for giving a notification of the voltage value of the secondary-side output voltage Vo to the primary side. In this manner, the control IC (not shown) controls the voltage (voltage waveform) to be generated in the secondary coil 403c. Then, the voltage generated in the secondary coil 403c is rectified and smoothed by the diode 209 and the smoothing capacitor 210 so that the output voltage Vo is stabilized to a predetermined voltage.

[Operation of Snubber Circuit]

Figure 6B:
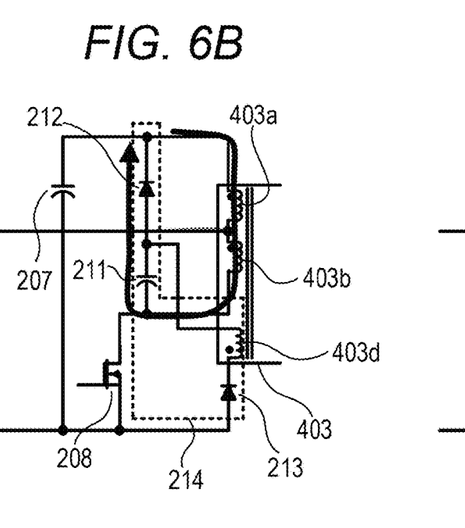
FIG. 6B and FIG. 6C are diagrams for illustrating current routes.
Figure 6C:
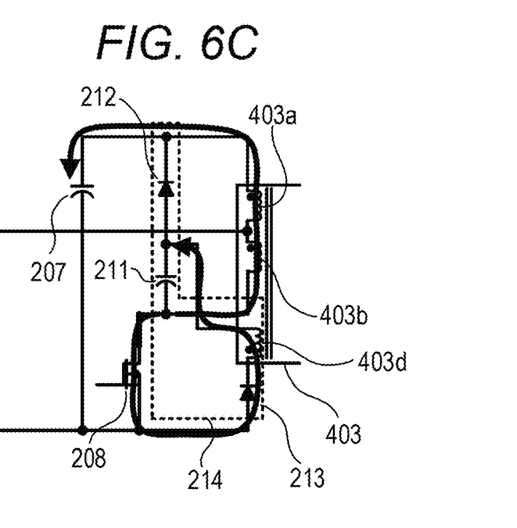

Next, an operation of the snubber circuit 214 is described with reference to the state explanatory diagrams of FIG. 6B and FIG. 6C. FIG. 6B and FIG. 6C are circuit diagrams obtained by extracting a surrounding circuit of the snubber circuit 214 of FIG. 5 in order to describe the operation of the snubber circuit 214. FIG. 6B is a diagram for illustrating a circuit operation performed immediately after the FET 208 is turned off (immediately after switching from the on state to the off state), and FIG. 6C is a diagram for illustrating a circuit operation performed immediately after the FET 208 is turned on (immediately after switching from the off state to the on state). The snubber circuit 214 in the second embodiment has, similarly to the first embodiment, a feature in the circuit operations performed immediately after the FET 208 is turned off and immediately after the FET 208 is turned on in terms of the circuit operation. The circuit operation in periods other than the periods immediately after the FET 208 is turned off and immediately after the FET 208 is turned on is the same as the circuit operation of a general switching power source apparatus not including the snubber circuit 214, and hence description thereof is omitted here.
(Circuit Operation Performed Immediately after FET 208 is Turned Off)

First, with reference to FIG. 6B, the circuit operation performed immediately after the FET 208 is turned off is described. When a low level signal is input from the control IC (not shown) to the gate terminal of the FET 208, an open state is achieved between the drain terminal and the source terminal of the FET 208. Then, a current which has been flowing so far from the primary coil 403b to the drain terminal of the FET 208 starts to flow to the clamp capacitor 211, and the clamp capacitor 211 is charged by the input current from the primary coil 403b. A current route of the charging current to the clamp capacitor 211 is a current route indicated by the thick arrow of FIG. 6B, and the charging current flows from the primary coil 403b to the clamp capacitor 211 and then to the diode 212. Depending on conditions of the input voltage of the output-side terminal 203c of the diode bridge 203 and the voltage of the smoothing capacitor 207, the current from the smoothing capacitor 207 also flows through the primary coils 403a and 403b. The drain voltage of the FET 208 at this time has a voltage waveform in a sine wave shape due to a resonant operation between a capacitance of the clamp capacitor 211 and an inductance of the primary coils 403a and 403b. Thus, the voltage gradually rises, and abrupt rise of the voltage is restricted.
(Circuit Operation Performed Immediately after FET 208 is Turned on)

Meanwhile, when a high level signal is input from the control IC (not shown) to the gate terminal of the FET 208, a conductive state is achieved between the drain terminal and the source terminal of the FET 208. This state is shown in FIG. 6C. The thick arrow of FIG. 6C shows a current route of a current discharged from the clamp capacitor 211. The primary coils 403a and 403b are coupled to the auxiliary coil 403d in the transformer 403. Accordingly, depending on a ratio of the number of turns between the auxiliary coil 403d and the primary coils 403a and 403b, the discharged current flowing from the clamp capacitor 211 is divided into a current flowing through the FET 208 and a current backflowing through the primary coils 403a and 403b. The current backflowing through the primary coils 403a and 403b becomes a regeneration current flowing into the smoothing capacitor 207, and part of energy (charged voltage of the clamp capacitor 211) generated by the surge voltage at the time when the FET 208 is turned off is regenerated in the smoothing capacitor 207 so as to be reused. Then, the clamp capacitor 211 in which the voltage charged by the surge voltage is discharged due to the flowing of the discharged current is brought into a state immediately before the charging current flows as illustrated in FIG. 6B, and is reset to a state in which the surge voltage (surge energy) can be accumulated again.

Meanwhile, the current flowing from the clamp capacitor 211 to the FET 208 flows to the auxiliary coil 403d via the diode 213, and the energy of the discharged current is accumulated in the auxiliary coil 403d. Then, the energy accumulated in the auxiliary coil 403d is converted as a secondary-side current when the FET 208 is turned off next time, to thereby be added to the secondary-side current obtained by converting the energy accumulated by the current flowing through the primary coils 403a and 403b. The diode 213 has a function of blocking the discharge of the charges of the clamp capacitor 211 through the auxiliary coil 403d. Further, the diode 213 and the auxiliary coil 403d are connected in the order of the diode 213 and the auxiliary coil 403d in the direction in which the discharged current from the clamp capacitor 211 flows, but the same circuit operation is achieved even when the diode 213 and the auxiliary coil 403d are connected in the order of the auxiliary coil 403d and the diode 213.

As described above, when the snubber circuit 214 is applied to the insulated switching power source 400 capable of improving a power factor, the surge voltage can be suppressed, and part of the surge energy caused by the surge voltage can be regenerated in the smoothing capacitor 207. Further, part of the surge energy can be accumulated in the auxiliary coil 403d so as to be converted as secondary-side energy.

The embodiment in which the low-loss snubber circuit in the present invention is applied to the flyback-type switching power source has been described in the first embodiment, and the embodiment in which the low-loss snubber circuit in the present invention is applied to the insulated switching power source capable of improving a power factor has been described in the second embodiment. The low-loss snubber circuit in the present invention is applicable to any switching-type power source apparatus as long as the power source apparatus has a circuit configuration in which the energy of the smoothing capacitor is transmitted to the transformer through the operation of the switching element. Further, in the switching power sources 200 and 400 each including the snubber circuit 214 described in the first and second embodiments, as described above, the power source efficiency can be improved as compared to a general switching power source. The printer 100 includes the fixing device 106 having large power consumption, but a value of a current which can be supplied from an electrical outlet has an upper limit. Accordingly, larger power source efficiency of the switching power source is an advantage, and particularly in a high-priced image forming apparatus having a large number of apparatus options and large power consumption, the switching power sources 200 and 400 having the above-mentioned configurations are effective.
(Consideration of Ratio of Number of Turns)

Next, similarly to the first embodiment, consideration is given to the ratio of the number of turns between the auxiliary coil 403d and the primary coils 403a and 403b of the transformer 403. Similarly to the charged voltage of the smoothing capacitor 207 of the switching power source 200, the voltage of the smoothing capacitor 207 of the switching power source 400 is charged roughly at a peak voltage value of the input voltage. Accordingly, the same idea as that for the first embodiment (for example, the expression (3) and the like) can be applied to the ratio (N2) of the number of turns between the secondary coil 403c and the auxiliary coil 403d, and hence description thereof is omitted.
(3. Ratio of Number of Turns Between Auxiliary Coil 403d and Primary Coils 403a and 403b)

The circuit configuration of the second embodiment is different from that of the first embodiment in that the primary coil is formed of two coils, specifically, the primary coil 403a and the primary coil 403b. The discharged current of the clamp capacitor 211 immediately after the FET 208 is turned on is determined based on the ratio of the number of turns between the auxiliary coil 403d and the primary coils 403a and 403b, and is divided into a current backflowing through the primary coils 403a and 403b and a current flowing through the FET 208. In this case, when the number of turns of the primary coil 403a is represented by "npa", the number of turns of the primary coil 403b is represented by "npb", the current flowing through the primary coils 403a and 403b is represented by I1, the number of turns of the auxiliary coil 403d is represented by "nc", and the current flowing through the auxiliary coil 403d is represented by I2, the relationship between the current I1 and the current I2 is expressed by the following expression (4).

$$I1 = nc/(npa+npb) \times I2 \qquad \text{Expression (4)}$$

When the number of turns "nc" is the same as the total number of turns npa+npb, the current I1 and the current I2 have the same value. This condition is not actually satisfied because this condition means that no current at all flows through the FET 208. Thus, the condition in which the number of turns "nc" and the total number of turns npa+npb have the same value becomes a condition in which no discharged current of the clamp capacitor 211 flows, and the surge energy cannot be efficiently used. Further, the condition of nc>npa+npb results in I1>I2, and a current equal to or larger than the discharged current flows through the FET 208. This condition is also impossible in principle. That is, the relationship between "nc" and npa+npb is required to satisfy the following expression (5).

$$nc < npa+npb \qquad \text{Expression (5)}$$

As described above, according to the second embodiment, the low-loss snubber circuit is applied to the insulated switching power source capable of improving a power factor. In this manner, the switching power source is configured so that the number of turns "nc" of the auxiliary coil 403d is smaller than the total number of turns npa+npb of the primary coil 403a and the primary coil 403b formed of two coils (nc<npa+npb). In this manner, while the generation of the surge voltage is suppressed, the efficiency of the switching power source can be improved.

As described above, the transformer 403 in the second embodiment is configured so that the number of turns "nc" of the auxiliary coil 403d is smaller than the total number of turns of the number of turns "npa" of the first primary coil 403a and the number of turns "npb" of the second primary coil 403b. Further, the transformer 403 is configured so that a product of the output voltage Vo and the ratio between the number of turns "nc" of the auxiliary coil 403d and the number of turns "ns" of the secondary coil 403c is equal to or lower than the voltage Vin of the smoothing capacitor 207 (refer to the expression (3)).

As described above, according to the second embodiment, while the generation of the surge voltage is suppressed, the efficiency of the power source apparatus using the switching element can be improved.

Third Embodiment

In the first and second embodiments, the embodiment in which the surge voltage to be generated when the FET 208 is turned off is suppressed, and the efficiency is improved by regenerating the energy caused by the surge voltage in the smoothing capacitor 207 and accumulating the energy in the auxiliary coil to supply the energy to the secondary side has been described. In a third embodiment, in contrast to the first and second embodiments, an embodiment in which the auxiliary coil 206d or the auxiliary coil 403d used in the snubber circuit 214 is configured to be used also in a power source voltage generating circuit serving as a generator for generating a power source voltage to be supplied to the control IC is described.

[Configuration of Switching Power Source]

Figure 7:
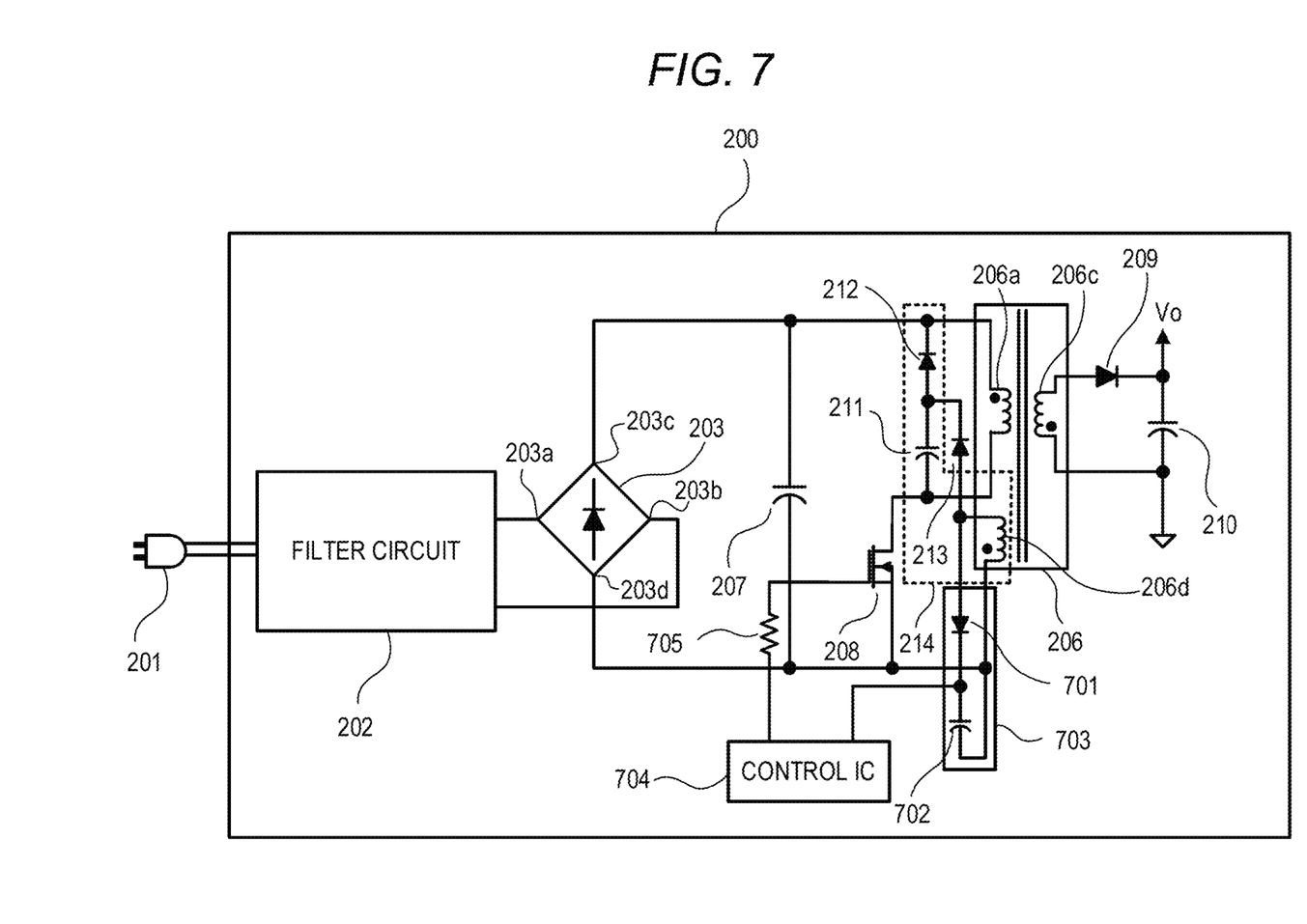
FIG. 7 is a circuit diagram for illustrating a circuit configuration of a switching power source according to the third embodiment.

The third embodiment is described with reference to the circuit diagram of FIG. 7. In the circuit diagram of FIG. 7, a power source voltage generating circuit 703 is added to the switching power source 200 according to the first embodiment illustrated in FIG. 2. The same components as those of FIG. 2 are denoted by the same reference symbols. In FIG. 7, the diode 213 and the auxiliary coil 206d are arranged at reverse positions as compared to those of FIG. 2.

In FIG. 7, the power source voltage generating circuit 703 includes a diode 701 and a capacitor 702. The diode 701 is a diode for rectifying an output voltage induced in the auxiliary coil 206d, and the capacitor 702 is a capacitor for smoothing the voltage rectified by the diode 701. Further, a control IC 704 is a control unit for controlling the switching power source 200. The control IC 704 operates by being supplied with, as a drive voltage, a direct-current voltage generated by the power source voltage generating circuit 703. Then, the control IC 704 changes a pulse width or a duty of a control signal to be output to the gate terminal of the FET 208, based on, for example, the feedback signal (not shown) from the secondary-side feedback circuit (not shown) described above, to thereby control the output voltage Vo to a constant voltage. A resistor 705 is a gate resistor for regulating the current flowing from the control IC 704 to the gate terminal of the FET 208.

Next, the operation of the power source voltage generating circuit 703 is described. In the following, the description of the same circuit operation as that of the first embodiment is omitted, and the characteristic circuit operation of FIG. 6B and FIG. 6C is focused and described. First, when the FET 208 is turned off, and the drain voltage of the FET 208 rises due to the influence of the parasitic capacitance and the leakage inductance of the transformer 206, as described above, the clamp capacitor 211 is charged and the voltage rising speed is decreased. At this time, the coil winding start of the auxiliary coil 206d is opposite to that of the primary coil 206a, and hence a positive voltage is generated on the anode terminal side of the diodes 213 and 701 of the auxiliary coil 206d. Next, when the FET 208 is turned on, the charges of the clamp capacitor 211 are discharged, and a negative voltage is generated on the anode terminal side of the diodes 213 and 701 of the auxiliary coil 206d. As described above, the clamp capacitor 211 functions so as to repeat the charging and the discharging in accordance with the off/on state of the FET 208 so that the surge voltage is suppressed. Meanwhile, the auxiliary coil 206d alternately generates the positive voltage and the negative voltage in accordance with the off/on state of the FET 208. Further, the power source voltage generating circuit 703 rectifies and smooths those voltages generated alternately, and supplies the smoothed power source voltage to the control IC 704.

As described above, in the third embodiment, the auxiliary coil 206d used in the power source voltage generating circuit 703 is configured to be used also in the snubber circuit 214. In this manner, the surge voltage to be generated when the FET 208 is turned off can be reduced by the clamp capacitor 211. Further, the auxiliary coil 206d can be used in two circuits, and hence the cost can be reduced. The power source voltage generating circuit 703 is also applicable to the switching power source 400.

As described above, according to the third embodiment, while the generation of the surge voltage is suppressed, the efficiency of the power source apparatus using the switching element can be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-077665, filed Apr. 30, 2021, which is hereby incorporated by reference herein in its entirety.

What is claimed is:

1. A power source apparatus comprising:
   a transformer which includes a primary coil, a secondary coil, and an auxiliary coil, and has a primary side and a secondary side which are insulated from each other;
   a rectifier circuit which includes a first output terminal and a second output terminal, and is configured to rectify an alternating-current voltage;
   a smoothing capacitor, of which one end is connected to the first output terminal and to one end of the primary coil, and of which another end is connected to the second output terminal;
   a switching element, of which one end is connected to another end of the primary coil, and of which another end is connected to the second output terminal, and which is configured to be switched between an on state and an off state;
   a first series circuit, in which a capacitor and a first rectification element are connected in series, and which is connected in parallel to the primary coil; and
   a second series circuit, in which a second rectification element and the auxiliary coil are connected in series, and which is connected between a connection point between the capacitor and the first rectification element and the another end of the switching element,
   wherein the transformer is configured so that a number of turns of the auxiliary coil is smaller than a number of turns of the primary coil, and a value obtained by multiplying a ratio of the number of turns of the auxiliary coil to a number of turns of the secondary coil by an output voltage on the secondary side of the transformer is equal to or lower than a voltage of the smoothing capacitor,
   wherein when the switching element is switched to the on state, a current from the smoothing capacitor flows through the primary coil and energy is accumulated in the transformer, and
   wherein when the switching element is switched to the off state after the energy is accumulated in the transformer, a voltage is generated in the secondary coil,
   wherein the first rectification element is a diode,
   wherein one end of the capacitor is connected to the another end of the primary coil and the one end of the switching element, and another end of the capacitor is connected to an anode terminal of the diode, and
   wherein a cathode terminal of the diode is connected to the one end of the primary coil and the one end of the smoothing capacitor,
   wherein the second rectification element is a diode,
   wherein an anode terminal of the diode being the second rectification element is connected to the another end of the switching element and a cathode terminal of the diode being the second rectification element is connected to one end of the auxiliary coil, and
   wherein another end of the auxiliary coil is connected to the connection point, and
   wherein, when the switching element is turned off, a current flowing through the primary coil flows through the first series circuit so that the capacitor is charged to suppress a surge voltage.

2. The power source apparatus according to claim 1, wherein, when the switching element is turned on, in accordance with the number of turns of the primary coil and the number of turns of the auxiliary coil, a current from the capacitor flows through the primary coil to the smoothing capacitor and the auxiliary coil of the second series circuit.

3. The power source apparatus according to claim 1, wherein the power source apparatus is a power source configured for a 100-volt input voltage, and
   wherein the transformer is configured so that the ratio of the number of turns of the auxiliary coil to the number of turns of the secondary coil is 2.5 or more and 3.5 or less.

4. The power source apparatus according to claim 1, wherein the power source apparatus is a power source configured for a 200-volt input voltage, and
   wherein the transformer is configured so that the ratio of the number of turns of the auxiliary coil to the number of turns of the secondary coil is 3 or more.

* * * * *